US008734257B2

(12) United States Patent
Davis et al.

(10) Patent No.: US 8,734,257 B2

(45) Date of Patent: May 27, 2014

(54) WAGER GAMING VOTING LEADERBOARD

(75) Inventors: Dwayne A. Davis, Reno, NV (US); Dwayne R. Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 312 days.

(21) Appl. No.: 13/250,835

(22) Filed: Sep. 30, 2011

(65) Prior Publication Data

US 2013/0084552 A1 Apr. 4, 2013

(51) Int. Cl.
*A63F 13/00* (2006.01)

(52) U.S. Cl.
USPC .................... 463/42; 463/16; 463/20; 463/25

(58) Field of Classification Search
USPC .......................................... 463/16, 20, 25, 42
See application file for complete search history.

(56) References Cited

U.S. PATENT DOCUMENTS 4,922,522 A 5/1990 Scanlon
5,035,422 A 7/1991 Berman et al.
5,108,115 A 4/1992 Berman et al.
5,278,753 A 1/1994 Graft
5,283,734 A 2/1994 Von Kohorn et al.
5,327,485 A 7/1994 Leaden
5,359,510 A 10/1994 Sabaliauskas
5,453,015 A 9/1995 Vogel
5,772,446 A 6/1998 Rosen
5,921,865 A 7/1999 Scagnelli et al.
5,963,916 A 10/1999 Kaplan et al.
5,987,302 A 11/1999 Driscoll et al.
6,024,641 A 2/2000 Sarno et al.
6,077,162 A 6/2000 Weiss
6,131,085 A 10/2000 Rossides
6,193,605 B1 2/2001 Libby et al.
6,193,610 B1 2/2001 Junkin
6,236,900 B1 5/2001 Geiger
6,240,415 B1 5/2001 Blumberg
6,250,548 B1 6/2001 McClure et al.
6,343,990 B1 2/2002 Rasmussen et al.
6,358,145 B1 3/2002 Wong et al.
6,386,975 B1 5/2002 Peterson
6,390,921 B1 5/2002 Busch et al.
6,439,997 B1 8/2002 Brasseur et al.
6,443,840 B2 9/2002 Von Kohorn
6,540,608 B2 4/2003 Howson
6,578,008 B1 6/2003 Chacker
6,606,615 B1 8/2003 Jennings et al.
6,631,404 B1 10/2003 Philyaw
6,636,892 B1 10/2003 Philyaw
6,709,330 B1 3/2004 Klein et al.

(Continued)

OTHER PUBLICATIONS

Office Action dated Sep. 23, 2013 for related U.S. Appl. No. 13/250,813 (5 pages).

(Continued)

*Primary Examiner* — James S McClellan

(74) *Attorney, Agent, or Firm* — Neal, Gerber & Eisenberg LLP

(57) ABSTRACT

Disclosed herein are techniques and equipment for providing a voting point leaderboard system. Players playing wagering games may be awarded voting points for use in a poll with a plurality of candidates in exchange for game-play related activity. Players voting for the winning candidate in the poll may be given an award. Polls may include candidates which may be involved in a real-world contest. Players may be rewarded for voting for the candidate which wins the real-world contest.

16 Claims, 12 Drawing Sheets

(56) References Cited

U.S. PATENT DOCUMENTS

| | | | |
|---|---|---|---|
| 6,754,348 B1 | 6/2004 | Sako | |
| 6,791,588 B1 | 9/2004 | Philyaw | |
| 6,799,723 B2 | 10/2004 | Kotob et al. | |
| 6,869,358 B2 | 3/2005 | Yacenda | |
| 6,899,621 B2 | 5/2005 | Behm et al. | |
| 6,921,333 B2 | 7/2005 | Taguchi | |
| 6,929,544 B2 | 8/2005 | Osterer | |
| 6,935,945 B2 | 8/2005 | Orak | |
| 6,942,570 B2 | 9/2005 | Schneier et al. | |
| 6,947,966 B1 | 9/2005 | Oko, Jr. et al. | |
| 6,968,243 B1 | 11/2005 | Oh | |
| 6,996,444 B2 | 2/2006 | Ach, III | |
| 7,058,223 B2 | 6/2006 | Cox | |
| 7,162,433 B1 | 1/2007 | Foroutan | |
| 7,308,413 B1 | 12/2007 | Tota et al. | |
| 7,752,251 B1 | 7/2010 | Shuster et al. | |
| 7,775,873 B2 | 8/2010 | Aoki et al. | |
| 7,801,129 B2 | 9/2010 | Batteram et al. | |
| 8,019,641 B2 | 9/2011 | Foroutan | |
| 2001/0003099 A1 | 6/2001 | Von Kohorn | |
| 2001/0037234 A1 | 11/2001 | Parmasad et al. | |
| 2001/0042037 A1 | 11/2001 | Kam et al. | |
| 2001/0049648 A1 | 12/2001 | Naylor et al. | |
| 2002/0019767 A1 | 2/2002 | Babbitt et al. | |
| 2002/0120501 A1 | 8/2002 | Bell et al. | |
| 2002/0124247 A1 | 9/2002 | Houghton | |
| 2002/0155873 A1 | 10/2002 | Berman et al. | |
| 2002/0173349 A1 | 11/2002 | Ach, III | |
| 2002/0177483 A1 | 11/2002 | Cannon | |
| 2002/0188360 A1 | 12/2002 | Muramori et al. | |
| 2002/0198050 A1 | 12/2002 | Patchen | |
| 2003/0014428 A1 | 1/2003 | Mascarenhas | |
| 2003/0100361 A1 | 5/2003 | Sharpless et al. | |
| 2003/0115265 A1 | 6/2003 | Kitade et al. | |
| 2003/0171982 A1 | 9/2003 | Paul | |
| 2003/0195795 A1 | 10/2003 | Chacker | |
| 2003/0233274 A1 | 12/2003 | Urken et al. | |
| 2004/0088729 A1 | 5/2004 | Petrovic et al. | |
| 2004/0093235 A1 | 5/2004 | Chacker | |
| 2004/0093249 A1 | 5/2004 | Chacker | |
| 2004/0097283 A1 | 5/2004 | Piper et al. | |
| 2004/0187148 A1 | 9/2004 | Cassella | |
| 2004/0225386 A1 | 11/2004 | Thompson et al. | |
| 2004/0225387 A1 | 11/2004 | Smith, III | |
| 2004/0242297 A1 | 12/2004 | Walker et al. | |
| 2005/0004981 A1 | 1/2005 | Philyaw | |
| 2005/0108659 A1 | 5/2005 | Philyaw | |
| 2005/0144633 A1 | 6/2005 | Babayan | |
| 2005/0187021 A1 | 8/2005 | Daskalakis | |
| 2005/0289038 A1 | 12/2005 | Karapetian | |
| 2006/0019736 A1 | 1/2006 | Amada | |
| 2006/0121971 A1 | 6/2006 | Slomiany et al. | |
| 2006/0287043 A1 | 12/2006 | Englman et al. | |
| 2006/0292541 A1 | 12/2006 | Ehmann | |
| 2007/0060369 A1 | 3/2007 | Martin | |
| 2007/0186230 A1* | 8/2007 | Foroutan | 725/24 |
| 2008/0042352 A1 | 2/2008 | Darling | |
| 2008/0098417 A1* | 4/2008 | Hatamian et al. | 725/24 |
| 2008/0105751 A1 | 5/2008 | Landau | |
| 2008/0108429 A1 | 5/2008 | Davis et al. | |
| 2008/0126167 A1* | 5/2008 | Solaru | 705/8 |
| 2008/0182664 A1 | 7/2008 | Kaplan et al. | |
| 2008/0284103 A1* | 11/2008 | Cohen | 273/302 |
| 2008/0298386 A1* | 12/2008 | Fiatal | 370/449 |
| 2008/0311996 A1* | 12/2008 | Belton et al. | 463/42 |
| 2009/0011824 A1 | 1/2009 | Englman et al. | |
| 2009/0024457 A1 | 1/2009 | Foroutan | |
| 2009/0082088 A1 | 3/2009 | Anderson et al. | |
| 2009/0275410 A1 | 11/2009 | Kisenwether et al. | |
| 2010/0004058 A1 | 1/2010 | Acres | |
| 2010/0029367 A1 | 2/2010 | Englman et al. | |
| 2010/0035674 A1 | 2/2010 | Slomiany et al. | |
| 2011/0312409 A1* | 12/2011 | Vancura | 463/25 |
| 2013/0196750 A1 | 8/2013 | Gagner et al. | |

OTHER PUBLICATIONS

Office Action dated Sep. 23, 2013 for related U.S. Appl. No. 13/250,816 (5 pages).

Office Action dated Sep. 23, 2013 for related U.S. Appl. No. 13/250,817 (5 pages).

Office Action dated Sep. 23, 2013 for related U.S. Appl. No. 13/250,829 (6 pages).

Office Action dated Sep. 26, 2013 for related U.S. Appl. No. 13/250,832 (6 pages).

* cited by examiner

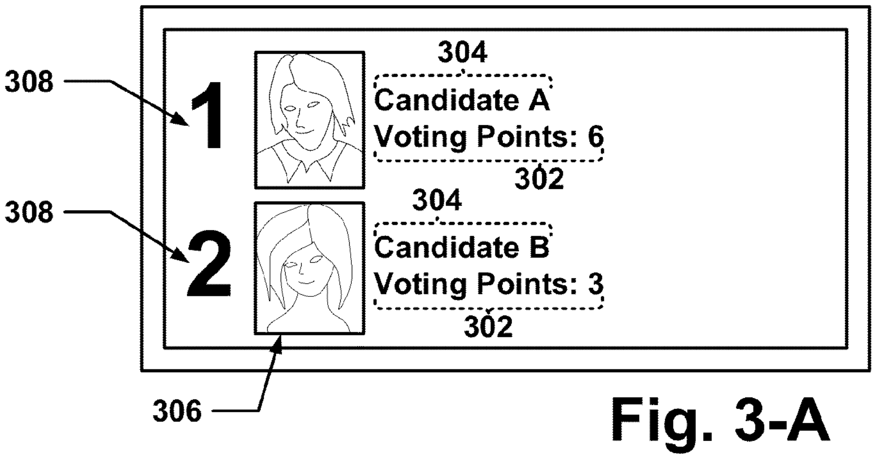
Fig. 3-A
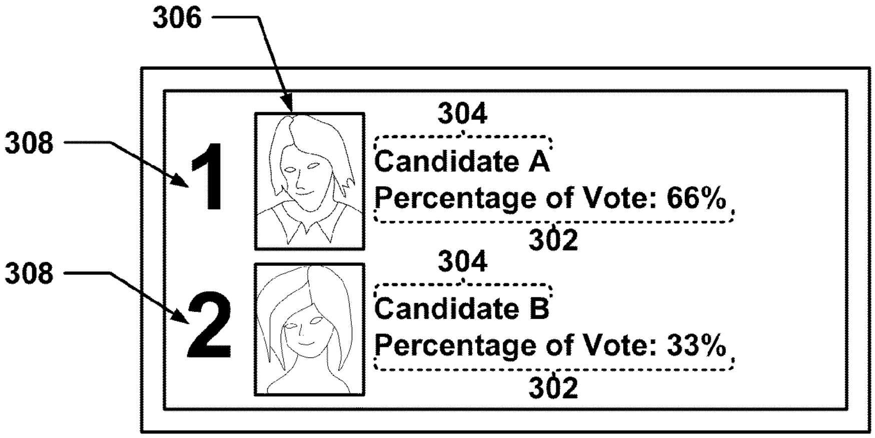
Fig. 3-B
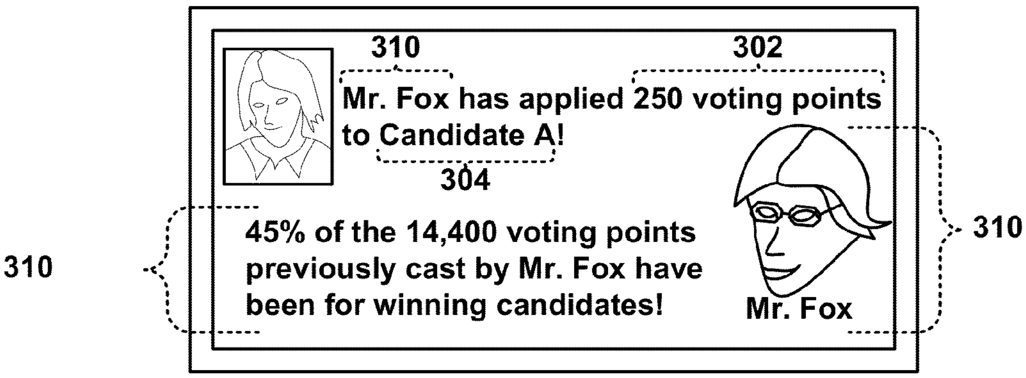
Fig. 3-C

| Candidate | Voting Points Applied | Voting Points Displayed on Leaderboard |
|---|---|---|
| Alice | 10,000 | 1400 |
| Bob | 2000 | 1200 |
| Charlie | 1000 | 1000 |

Fig. 4

| Available Voting Points | Associated Player | Player Score | Candidate Applied To |
|---|---|---|---|
| A | 1 | 6 | Alice |
| B | 2 | 10 | Bob |
| C | 3 | 7 | Charlie |
| D | 4 | 8 | Charlie |
| E | 5 | 8 | Charlie |
| F | 6 | 2 | |
| G | 7 | 5 | Charlie |
| H | 8 | 8 | Alice |
| I | 9 | 9 | Alice |
| J | 10 | 6 | Alice |

| Candidate Totals | |
|---|---|
| Alice | 4 |
| Charlie | 4 |
| Bob | 1 |

Fig. 5-A

| Available Voting Points | Associated Player | Player Score | Candidate Applied To |
|---|---|---|---|
| A | 1 | 6 | Alice |
| B | 2 | 10 | Bob |
| C | 3 | 7 | Charlie |
| D | 4 | 8 | Charlie |
| E | 5 | 8 | Charlie |
| F | 6 → 11 | 2 → 6 | |
| G | 7 | 5 | Charlie |
| H | 8 | 8 | Alice |
| I | 9 | 9 | Alice |
| J | 10 | 6 | Alice |

| Candidate Totals | |
|---|---|
| Alice | 4 |
| Charlie | 4 |
| Bob | 1 |

Fig. 5-B

| Available Voting Points | Associated Player | Player Score | Candidate Applied To |
|---|---|---|---|
| A | 1 | 6 | Alice |
| B | 2 | 10 | Bob |
| C | 3 | 7 | Charlie |
| D | 4 | 8 | Charlie |
| E | 5 | 8 | Charlie |
| F | 11 | 6 | Charlie |
| G | 7 | 5 | Charlie |
| H | 8 | 8 | Alice |
| I | 9 | 9 | Alice |
| J | 10 | 6 | Alice |

| Candidate Totals | |
|---|---|
| Charlie | 5 |
| Alice | 4 |
| Bob | 1 |

Fig. 5-C

| Available Voting Points | Associated Player | Player Score | Candidate Applied To |
|---|---|---|---|
| A | 1 | 6 | Alice |
| B | 2 | 10 | Bob |
| C | 3 | 7 | Charlie |
| D | 4 | 8 | Charlie |
| E | 5 | 8 | Charlie |
| F | 11 | 6 | Charlie |
| G | 7 → 12 | 5 → 6 | |
| H | 8 | 8 | Alice |
| I | 9 | 9 | Alice |
| J | 10 | 6 | Alice |

| Candidate Totals | |
|---|---|
| Alice | 4 |
| Charlie | 4 |
| Bob | 1 |

Fig. 5-D

| Available Voting Points | Associated Player | Player Score | Candidate Applied To |
|---|---|---|---|
| A | 1 | 6 | Alice |
| B | 2 | 10 | Bob |
| C | 3 | 7 | Charlie |
| D | 4 | 8 | Charlie |
| E | 5 | 8 | Charlie |
| F | 11 | 6 | Charlie |
| G | 12 | 6 | Alice |
| H | 8 | 8 | Alice |
| I | 9 | 9 | Alice |
| J | 10 | 6 | Alice |

| Candidate Totals | |
|---|---|
| Alice | 5 |
| Charlie | 4 |
| Bob | 1 |

Fig. 5-E

| Player | Polls Won in Past 10 Polls |
|---|---|
| A | 8 |
| B | 7 |
| C | 1 |
| D | 2 |
| E | 4 |
| F | 6 |
| G | 3 |
| H | 9 |

Fig. 6

WAGER GAMING VOTING LEADERBOARD

This application is related to U.S. patent application Ser. No. 13/250,775, entitled "STATE-BASED POWER-UPS" and filed on Sep. 30, 2011, and is also related to U.S. patent application Ser. No. 13/250,778, entitled "STATE-BASED POWER-UPS" and filed on Sep. 30, 2011, and is also related to U.S. patent application Ser. No. 13/250,782, entitled "STATE-BASED POWER-UPS" and filed on Sep. 30, 2011, and is also related to U.S. patent application Ser. No. 13/250,788, entitled "STATE-BASED POWER-UPS" and filed on Sep. 30, 2011, and is also related to U.S. patent application Ser. No. 13/250,790, entitled "STATE-BASED POWER-UPS" and filed on Sep. 30, 2011, and is also related to U.S. patent application Ser. No. 13/250,795, entitled "STATE-BASED POWER-UPS" and filed on Sep. 30, 2011, and is also related to U.S. patent application Ser. No. 13/250,802, entitled "STATE-BASED POWER-UPS" and filed on Sep. 30, 2011, and is also related to U.S. patent application Ser. No. 13/250,808, entitled "STATE-BASED POWER-UPS" and filed on Sep. 30, 2011, and is also related to U.S. patent application Ser. No. 13/250,813, entitled "WAGER GAMING VOTING LEADERBOARD" and filed on Sep. 30, 2011, and is also related to U.S. patent application Ser. No. 13/250,816, entitled "WAGER GAMING VOTING LEADERBOARD" and filed on Sep. 30, 2011, and is also related to U.S. patent application Ser. No. 13/250,817, entitled "WAGER GAMING VOTING LEADERBOARD" and filed on Sep. 30, 2011, and is also related to U.S. patent application Ser. No. 13/250,829, entitled "WAGER GAMING VOTING LEADERBOARD" and filed on Sep. 30, 2011, and is also related to U.S. patent application Ser. No. 13/250,832, entitled "WAGER GAMING VOTING LEADERBOARD" and filed on Sep. 30, 2011, all of which are hereby incorporated by reference and for all purposes.

TECHNICAL FIELD

The present disclosure relates generally to wager-based gaming machines, and more specifically to interactive player voting systems for use in wager-based gaming systems.

BACKGROUND

Entities offering wager gaming may provide various incentives to induce players to engage in continued or increased revenue-generating game play. For example, player tracking systems may offer players rewards based on their game play. Other methods may involve recognizing exceptional play of a player, such as posting a player's name as a top-ten player in a public setting.

SUMMARY

In some wager gaming player polling server implementations, a wager gaming player polling server is provided. The wager gaming player polling server may include a communications interface, a memory, and a logic device. The logic device, the memory, and the communications interface may be operably connected and configured to determine a first plurality of candidates for inclusion in a first poll, the first plurality of candidates including a first candidate, and receive input, via the communications interface, indicating a first quantity of voting points associated with a first player to apply towards the first candidate in the first poll. The logic device, the memory, and the communications interface may be further configured to determine, based on a total number voting points applied to each candidate in the first plurality of candidates by players in a plurality of players, the first player included in the plurality of players, a ranking for each candidate in the first poll, and determine that a voting point retention condition has been met with respect to the first poll. The logic device, the memory, and the communications interface may also be further configured to maintain the association of the first quantity of voting points with the first player at least until a second poll is conducted.

In some wager gaming player polling server implementations, the logic device, the memory, and the communications interface may be further configured to determine a second plurality of candidates for inclusion in a second poll, the second plurality of candidates including a second candidate, and receive input, via the communications interface, indicating a second quantity of voting points associated with the first player to apply towards the second candidate in the second poll. The logic device, the memory, and the communications interface may also be further configured to determine, based on a total number voting points applied to each candidate in the second plurality of candidates by the players in the plurality of players, a ranking for each candidate in the second poll and determine that the voting point retention condition has not been met with respect to the second poll. Such implementations may also be configured to disassociate at least the second quantity of voting points from the first player after determining that the voting point retention condition has not been met.

In some wager gaming player polling server implementations, the logic device, the memory, and the communications interface may be further configured, for each intermediate poll in one or more intermediate polls in between the first poll and the second poll, to determine a plurality of candidates for inclusion in the intermediate poll and receive input, via the communications interface, indicating a quantity of voting points associated with the first player to apply towards a candidate in the intermediate poll. The logic device, the memory, and the communications interface may also be further configured to determine, based on a total number voting points applied to each candidate in the plurality of candidates by the players in the plurality of players, a ranking for each candidate in the intermediate poll and determine, for each intermediate poll, that the voting point retention condition has been met with respect to the intermediate poll.

In some implementations, computer software stored in a machine-readable medium may be provided. The computer software may include instructions for controlling devices in a gaming network, the gaming network including a server, a storage device communicatively connected to the server, and a plurality of input stations, to determine, by the server, a first plurality of candidates for inclusion in a first poll, the first plurality of candidates including a first candidate, and receive, via a player input station in the plurality of player input stations, input indicating a first quantity of voting points associated with a first player in a plurality of players to apply towards the first candidate in the first poll. The computer software may further include instructions for controlling the devices in the gaming network to determine, by the server and based on a total number voting points applied to each candidate in the first plurality of candidates by the players in the plurality of players, a ranking for each candidate in the first poll and determine, by the server, that a voting point retention condition has been met with respect to the first poll. The computer software may also include instructions for controlling the devices in the gaming network to maintain, by the server, the association of the first quantity of voting points with the first player at least until a second poll is conducted.

In some machine-readable medium implementations, the computer software may further include instructions for controlling the devices in the gaming network to determine a second plurality of candidates for inclusion in a second poll, the second plurality of candidates including a second candidate and the second poll after the first poll, and receive, from the first player, input indicating a second quantity of voting points associated with the first player to apply towards the second candidate in the second poll. The computer software may further include instructions for controlling the devices in the gaming network to determine, based on a total number voting points applied to each candidate in the second plurality of candidates by the players in the plurality of players, a ranking for each candidate in the second poll, determine that the voting point retention condition has not been met with respect to the second poll, and disassociate at least the second quantity of voting points from the first player after determining that the voting point retention condition has not been met.

In some machine-readable medium implementations, the computer software may further include instructions for controlling the devices in the gaming network, for each intermediate poll in one or more intermediate polls in between the first poll and the second poll, to determine a plurality of candidates for inclusion in the intermediate poll and receive, from the first player, input indicating a quantity of voting points associated with the first player to apply towards a candidate in the intermediate poll. The computer software may further include instructions for controlling the devices in the gaming network to determine, based on a total number voting points applied to each candidate in the plurality of candidates by the players in the plurality of players, a ranking for each candidate in the intermediate poll, and determine that the voting point retention condition has been met with respect to the intermediate poll.

In some implementations, the voting point retention condition, with respect to any particular poll of the first poll, the second poll, and the one or more intermediate polls, may be that the first player apply more voting points to a highest-ranked candidate of the particular poll than to any other candidate in the particular poll. In some implementations, the voting point retention condition may involve a first subcondition and a second subcondition. The first subcondition, with respect to any particular poll of the first poll, the second poll, and the one or more intermediate polls, may be that the first player apply more voting points to a highest-ranked candidate of the particular poll than to any other candidate in the particular poll. The second subcondition may be that the first subcondition be met for at least N of M successive polls.

In some implementations, the voting point retention condition, with respect to any particular poll of the first poll, the second poll, and the one or more intermediate polls, may be that the first player apply more voting points to a highest-ranked candidate of the particular poll than to any other candidate in the particular poll, and that the highest-ranked candidate in the particular poll win a contest which concludes after the end of the particular poll.

In some implementations, the voting point retention condition may further include a third subcondition. The third subcondition may be that the first player maintain a minimum ranking of R or higher among a group of players including the first player. Each particular player in the group of players may be ranked according to the number of polls in the M successive polls in which the particular player met the second subcondition.

In some implementations, the voting point retention condition comprises the first player maintaining a predetermined coin-in rate.

BRIEF DESCRIPTION OF THE DRAWINGS

The included drawings are for illustrative purposes and serve only to provide examples of possible structures and process steps for the disclosed inventive systems, methods, and apparatuses for providing voting point polling systems for wagering game play. These drawings in no way limit any changes in form and detail that may be made to implementations of the systems, methods, and apparatuses disclosed herein by one skilled in the art without departing from the spirit and scope of the disclosure.

FIGS. 3A-3C depict various examples of candidate information and voting information.

FIG. 4 depicts a table showing voting points applied and voting points displayed for three candidates in one implementation.

FIGS. 5A-E depict tables showing voting points applied by various players for three candidates in one implementation.

FIG. 6 depicts a table showing players in a group of players and each player's total number of polls won in the previous 10 polls.

DETAILED DESCRIPTION

Although the following text sets forth a detailed description of numerous different embodiments, it should be understood that the legal scope of the invention is defined by the words of the claims set forth at the end of this patent. The detailed description is to be construed as an example only and does not describe every possible embodiment since describing every possible embodiment would be impractical, if not impossible. Numerous alternative embodiments may be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1A:
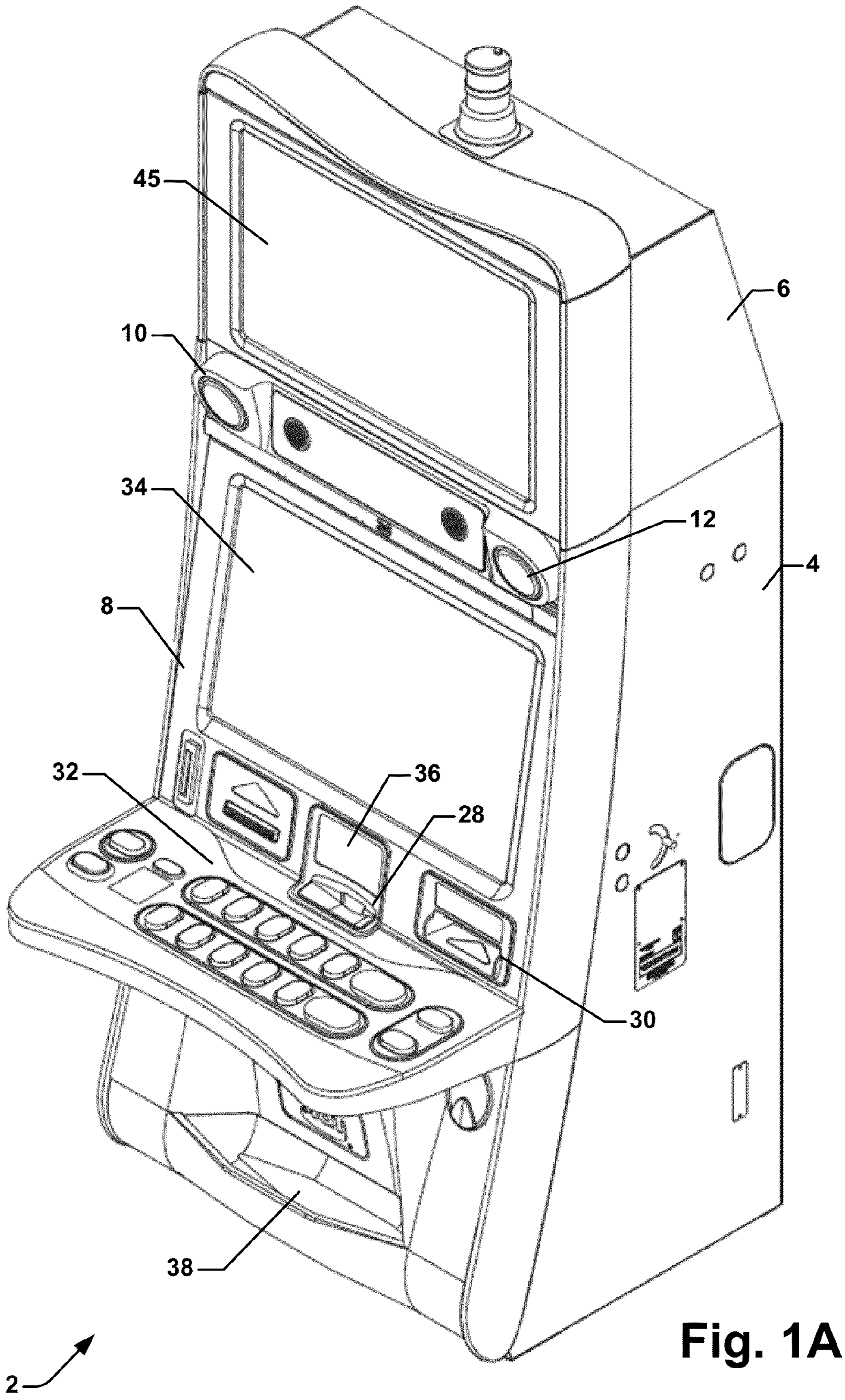
FIGS. 1A-1C depict isometric, front, and side views, respectively, of a wagering game machine which may be used in the techniques described below.
Figure 1B:
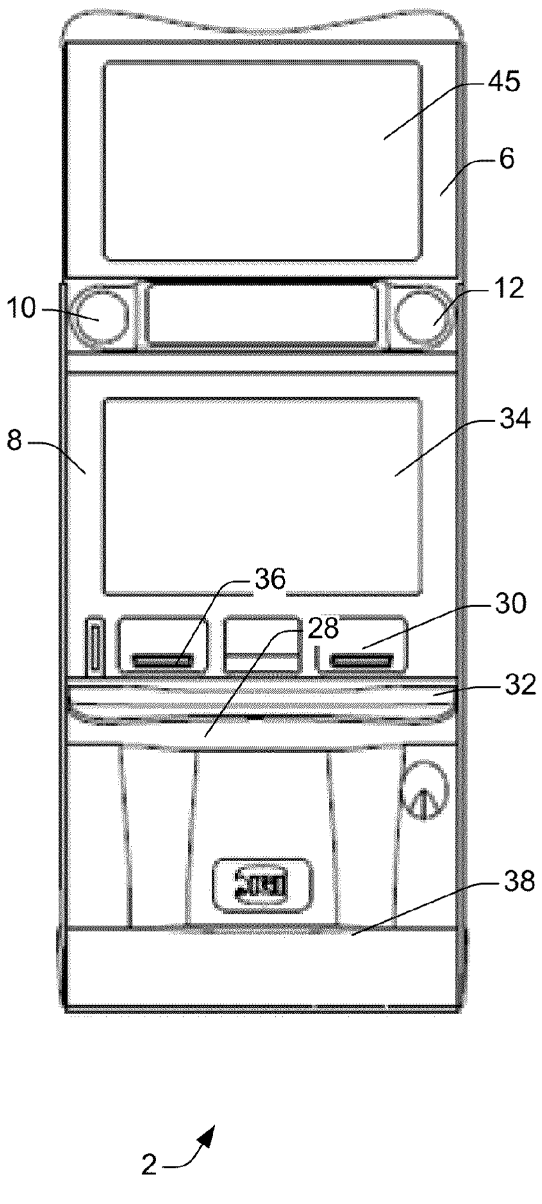
Figure 1C:
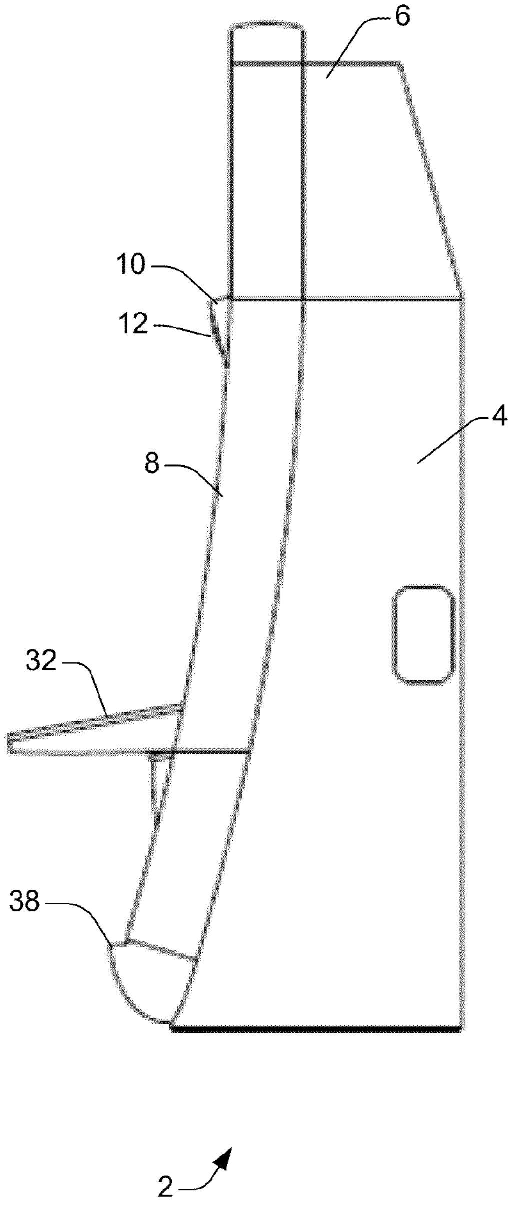

FIGS. 1A, 1B, and 1C show isometric, front, and side views, respectively, of a gaming machine 2, configured in accordance with one implementation. As illustrated in FIGS. 1A-1C, gaming machine 2 includes a main cabinet 4, which generally surrounds the machine interior and is viewable by users. The main cabinet includes a main door 8 on the front of the machine, which opens to provide access to the interior of the machine.

In some implementations, the electronic gaming machine may include any of a plurality of devices. For example, the electronic gaming machine may include a ticket printer that prints bar-coded tickets, a key pad for entering player tracking information, a display (e.g., a video display screen) for displaying player tracking information, a card reader for entering a magnetic striped card containing player tracking information, and any other devices. The ticket printer may be used to print tickets for a cashless ticketing system. In FIGS. 1A-1C, attached to the main door is a payment acceptor 28, a bill validator 30, and a coin tray 38. The payment acceptor may include a coin slot and/or a payment, note, or bill acceptor, where the player inserts money, coins, tokens, or other types of payments.

In some implementations, devices such as readers or validators for credit cards, debit cards, smart cards, or credit slips may facilitate payment. For example, a player may insert an identification card into a card reader of the gaming machine. The identification card may be a smart card coded with a player's identification, credit totals (or related data) and other relevant information. As another example, a player may carry a portable device, such as a cell phone, a radio frequency identification tag or any other suitable wireless device. The portable device may communicates a player's identification, credit totals (or related data), and/or any other relevant information to the gaming machine. As yet another example, money may be transferred to a gaming machine through electronic funds transfer. When a player funds the gaming machine, a another logic device coupled to the gaming machine may determine the amount of funds entered and display the corresponding amount on a display device.

In some implementations, attached to the main door are a plurality of player-input switches or buttons 32. The input switches can include any suitable devices which enables the player to produce an input signal which is received by the processor. The input switches may include a game activation device that may be used by the player to start any primary game or sequence of events in the gaming machine. The game activation device can be any suitable play activator such as a "bet one" button, a "max bet" button, or a "repeat the bet" button. In some instances, upon appropriate funding, the gaming machine may begin the game play automatically. Alternately, the gaming machine may automatically activate game play after detecting user input via the game activation device.

In some implementations, one input switch is a cash-out button. The player may push the cash-out button and cash out to receive a cash payment or other suitable form of payment corresponding to the number of remaining credits. For example, when the player cashes out, the player may receive the coins or tokens in a coin payout tray. As another example, the player may receive other payout mechanisms such as tickets or credit slips redeemable by a cashier (or other suitable redemption system) or funding to the player's electronically recordable identification card. As yet another example, funds may be transferred from the gaming machine to the player's smart card.

In some implementations, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In some implementations, the gaming machine may include communication ports for enabling communication of the gaming machine processor with external peripherals, such as external video sources, expansion buses, game or other displays, a SCSI port, a key pad, or a network interface for communicating via a network.

In some implementations, the gaming machine may include a label area, such as the label area 36. The label area may be used to display any information or insignia related to activities conducted at the gaming machine.

In some implementations, the electronic gaming machine may include one or more display devices. For example, the electronic gaming machine 2 includes display devices 34 and 45. The display devices 34 and 45 may each include any of a cathode ray tube, an LCD, a light emitting diode (LED) based display, an organic light emitting diode (OLED) based display, a polymer light emitting diode (PLED) based display, an SED based-display, an E-ink display, a plasma display, a television display, a display including a projected and/or reflected image, or any other suitable electronic display device.

In some implementations, the display devices at the gaming machine may include one or more electromechanical devices such as one or more rotatable wheels, reels, or dice. The display device may include an electromechanical device adjacent to a video display, such as a video display positioned in front of a mechanical reel. The display devices may include dual-layered or multi-layered electromechanical and/or video displays that cooperate to generate one or more images. The display devices may include a mobile display device, such as a smart phone or tablet computer, that allows play of at least a portion of the primary or secondary game at a location remote from the gaming machine. The display devices may be of any suitable size and configuration, such as a square, a rectangle or an elongated rectangle.

In some implementations, the display devices of the gaming machine are configured to display game images or other suitable images. The images may include symbols, game indicia, people, characters, places, things, faces of cards, dice, and any other images. The images may include a visual representation or exhibition of the movement of objects such as mechanical, virtual, or video reels and wheel. The images may include a visual representation or exhibition of dynamic lighting, video images, or any other images.

In some implementations, the electronic gaming machine may include a top box. For example, the gaming machine 2 includes a top box 6, which sits on top of the main cabinet 4. The top box 6 may house any of a number of devices, which may be used to add features to a game being played on the gaming machine 2. These devices may include speakers 10 and 12, display device 45, and any other devices. Further, the top box 6 may house different or additional devices not illustrated in FIGS. 1-2B. For example, the top box may include a bonus wheel or a back-lit silk screened panel which may be used to add bonus features to the game being played on the gaming machine. As another example, the top box may include a display for a progressive jackpot offered on the gaming machine. As yet another example, the top box may include a smart card interaction device. During a game, these devices are controlled and powered, at least in part, by circuitry (e.g. a master gaming controller) housed within the main cabinet 4 of the machine 2.

In some implementations, speakers may be mounted and situated in the cabinet with an angled orientation toward the player. For instance, the speakers 10 and 12 located in top box area 6 of the upper region of gaming machine 2 may be mounted and situated in the cabinet with an angled orientation down towards the player and the floor. In one example, the angle is 45 degrees with respect to the vertical, longitudinal axis of machine 2. In another example, the angle is in a range of 30-60 degrees. In another example, the angle is any angle between 0 and 90 degrees. In some implementations, the angle of speakers in the gaming machine may be adjustable. For instance, speakers may be adjusted to face in a direction more closely approximating an estimated position of a player's head or facial features.

The bill validator 30, player-input switches 32, display screen 34, and other gaming devices may be used to present a game on the game machine 2. The devices may be controlled by code executed by a master gaming controller housed inside the main cabinet 4 of the machine 2. The master gaming controller may include one or more processors including general purpose and specialized processors, such as graphics cards, and one or more memory devices including volatile and non-volatile memory. The master gaming controller may periodically configure and/or authenticate the code executed on the gaming machine.

In some implementations, the gaming machine may include a sound generating device coupled to one or more sounds cards. The sound generating device may include one or more speakers or other sound generating hardware and/or software for generating sounds, such as playing music for the primary and/or secondary game or for other modes of the gaming machine, such as an attract mode. The gaming machine may provide dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In some implementations, the gaming machine may include a sensor, such as a camera that is selectively positioned to acquire an image of a player actively using the gaming machine and/or the surrounding area of the gaming machine. The sensor may be configured to capture biometric data about a player in proximity to the gaming machine. The biometric data may be used to implement mechanical and/or digital adjustments to the gaming machine. Alternately, or additionally, the sensor may be configured to selectively acquire still or moving (e.g., video) images. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol, animated avatar, or game indicia. In some implementations, the sensor may be used to trigger an attract mode effect. For example, when the sensor detects the presence of a nearby player, the gaming machine may play sound effects or display images, text, graphics, lighting effects, or animations to attract the player to play a game at the gaming machine.

Gaming machine 2 is but one example from a wide range of gaming machine designs on which the techniques described herein may be implemented. For example, not all suitable gaming machines have top boxes or player tracking features. Further, some gaming machines have only a single game display—mechanical or video, while others may have multiple displays.

Figure 2:
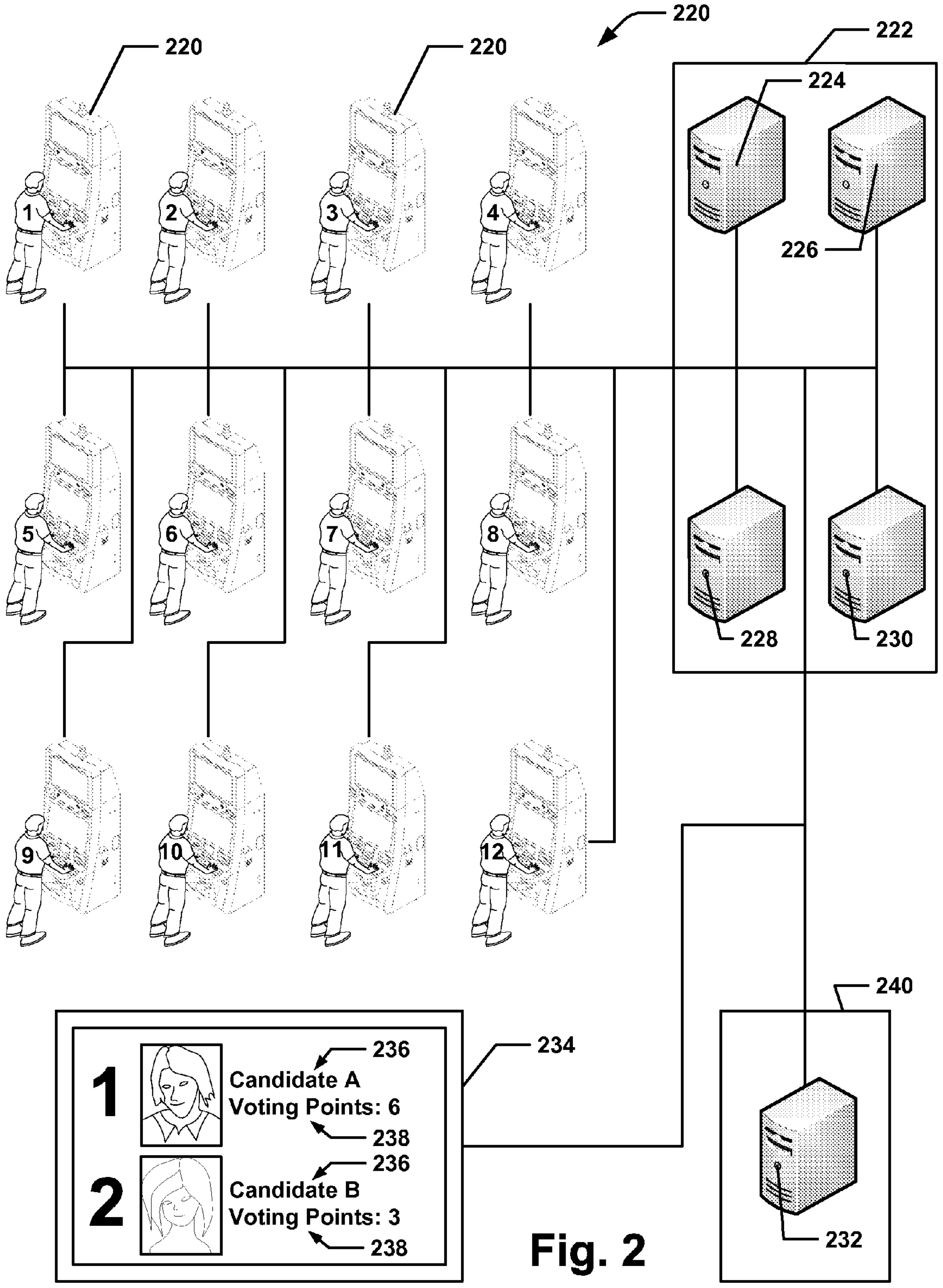
FIG. 2 depicts a high-level conceptual diagram of a voting point polling system for use with wager gaming machines.

FIG. 2 depicts one example implementation of system 200 used to provide player voting functionality according to the techniques and equipment outlined herein. A number of gaming machines 220 may be integrated with system 200 to allow players 1-12 to participate in wager gaming play. While this example shows only twelve gaming machines 220 and twelve players 1-12, it is to be recognized that many more gaming machines 220 and players could be accommodated. Moreover, it is to be further recognized that gaming machines 220 need not all be the same type, kind, or brand—the voting functionality described herein may be implemented on a variety of different devices. Gaming machines 220 may, for example, be similar to gaming machine 2 in FIGS. 1A-1C. Furthermore, it is to be recognized that the devices and equipment used to provide voting functionality may be distributed across a casino, across multiple casinos, or even across multiple cities or countries. For ease of reference, FIG. 2 depicts only a relatively small number of participating gaming machines.

Each player 1-12 may, in response to various triggers, earn one or more voting points which are associated with the player and may be applied by the player to a candidate of the player's choice in a poll. In some implementations, the player may apply associated voting points to a candidate of the player's choice via an interface at gaming machine 220. In some implementations, the player may apply the voting points via an interface offered on a non-gaming machine, such as via a service kiosk, hotel media network, or through a web interface. The interface may provide inputs for reviewing and selecting candidates in a poll, such as picture icons or text icons representing each candidate on a touchscreen, buttons which correspond with images or text on a display, or a GUI on a desktop computer.

The polls for which voting functionality is provided may reflect contests which are, or would be, of public interest. For example, a poll may include candidates from a popular talent show, such as American Idol. The candidates in the poll may match the current (or past) candidates in a current season of such a talent show. Other examples of pools from which poll candidates may be drawn include beauty pageant contestants, reality-based television shows, real-world political personalities, sports teams or athletes, race horses, race car drivers, and charities. In some implementations, candidates may be selected from the players themselves.

In FIG. 2, players 1-11 have each earned a single voting point in response to a trigger. Players 1, 2, 5, 6, 9, and 11 have each indicated, via an interface on the gaming machine 220 in use by the player, that their respective voting points should be applied towards candidate A. Players 3, 4, and 7 have each indicated, via the interface on the gaming machine 220 in use by the player, that their respective voting points should be applied towards candidate B. While players 8 and 10 have each earned a voting point, they have not yet used the voting interfaces on their respective gaming machines 220 to apply those voting points to either candidate A or candidate B. Player 12 has not yet earned a voting point, and thus cannot vote for either candidate A or candidate B.

In some implementations, players may only be allowed to apply a voting point associated with the player once. In such implementations, once a voting point is applied to a candidate, the player applying the voting point is not allowed to switch the voting point to apply to another candidate. The applied voting point is, in effect, permanently applied to the candidate for the duration of the poll.

In other implementations, players may be allowed to retract a voting point previously applied to one candidate. In such implementations, the player may then choose to apply the retracted voting point to another candidate. Such non-permanent voting implementations may be used to present polls which are more fluid and dynamic than permanent-vote polls. This may be more exciting and engaging for players due to the possibility that players who voted for one candidate might change their minds and defect to another candidate.

In some implementations, players may only be associated with a maximum of one voting point. In other implementations, players may be associated with one or more voting points. In either case, voting points may be applied to candidates on either a permanent or non-permanent basis as described above.

For the purposes of this paper, a voting point which is associated with a player is a voting point which the player has the right to apply to a candidate in a poll. The association may be anonymous, e.g., tied to the gaming machine that the player is using but not to the player themselves, or tied to the identity of the player, e.g., to a player tracking account associated with the player. Voting points may also be associated with a player using a physical system, such as a printed voucher which is redeemable for voting points by feeding it into a voucher reader on a gaming machine or kiosk.

Data regarding voting point application by players 1-12 may be transmitted by gaming machines 220, equipment associated with gaming machines 220, or by other equipment used by players to apply voting points to candidates in a poll via a communications link to data processing center 222. Data processing center 222 may, for example, be on-site at a casino or be a purpose-built casino data center servicing multiple casinos. Data processing center 222 may include game play server 224, player tracking server 226, voting server 228, and external communications server 230.

Game play server 224 may be configured to track game play offered by gaming machines 220. In some situations, game play may be provided by game play server 224, although in other situations, game play server 224 may only monitor game play otherwise provided by gaming machine 220. Game play server 224 may be configured to recognize and track trigger events occurring during game play that would earn a player associated with the trigger event one or more voting points.

Player tracking server 226 may be configured to track the identities of players using gaming machines 220. A player may identify themselves to a gaming machine 220 which they are playing, and player tracking server 226 may then, based on the identification, associated game play, game play events, and voting points earned by the player with a player tracking account associated with the player.

Voting server 228 may be configured to track and tally the voting points applied to each candidate in a poll by various players. Voting server 228 may also be configured to manage the various polls which may be presented to players at various times of the day, as well as the candidates in each poll. Voting server 228 may also be configured to communicate summaries of voting results to other equipment for presentation to players, the general public, or other entities. Voting server 228 may also determine, based on the total number of voting points applied to each candidate, the ranking of each candidate in the poll with respect to the other candidates in the poll.

Voting server 228 may track and tally the voting points applied to each candidate in a poll by the various players using a database. For example, the database may include records reflecting each application of voting points to the candidates. Such data may be queried using the database to determine the sum total voting points applied to each candidate over a period of time such as, for example, the current polling period or a past polling period. In some implementations, the database may record only running totals for applied voting points for each candidate. In some other implementations, the database may record each player's application of voting points. Such detailed record-keeping may allow a player's past application of voting points to be "undone" if the player changes their mind (and if the player polling system allows the it). Such detailed record-keeping may also allow for polling systems in which players may "lose" their already-cast voting points to other players, who may decide to allocate the voting points differently. The database may also include information regarding the number of voting points associated with each player. The database may be a single database, or may be distributed across several sub-databases and/or computers. Portions of the database may be included within other databases. For example, records indicating the number of voting points which are associated with a player may be contained within a player tracking database, which may be separate from the polling database.

External communications server 230 may be configured to communicate poll results to external sites. For example, in some implementations, the voting points applied to a particular candidate, or information derived from such voting points, may be communicated to external site 240 controlled by an entity other than a casino, e.g., server 232 which registers votes for a televised talent show such as American Idol. In some implementations, such communication may occur via a network connection, phone line, or other link. In some implementations, external communications server 230 may be configured to send text messages to a phone number associated with the outside entity to communicate voting point information.

In some implementations, some of the functionality of the data processing center described above may be omitted or provided in a different manner, such as via a distributed system. Additionally, the functionality of the various servers in data processing center 222 may be combined or divided differently than shown. It is to be recognized that while FIG. 2 depicts single-machine servers, such depictions may represent several servers or processors which operate in tandem to provide the functionality of the server. In some implementations, some of the functionality provided by the servers in data processing center 222 may be provided by gaming machines 220. For example, gaming machines 220 may provide game play locally and be configured to recognize trigger events which earn voting points for players and to associate the earned voting points with the players. In a further example, gaming machines 220 may be configured to send text messages or other communications to external site 240 directly without need for routing the messages through data processing center 222.

Data regarding a poll may be displayed to players, as well as others, while the poll is being conducted. For example, leaderboard 234 may be used to display voting information and candidate information to players, bystanders, or the general public. Voting leaderboard 234 may be a purpose-built physical device which in a casino or integrated into a gaming machine. Voting leaderboard 234 may also be implemented as part of a graphical display on gaming machines 220 or on a web page.

Voting information and candidate information may take several forms. Some example variations on voting information and candidate information are depicted in FIGS. 3A through 3C. In FIG. 3A, voting information 302 is the total number of voting points applied to a particular candidate and candidate information 304 identifies the candidate. In FIG. 3A, such information is displayed for multiple candidates simultaneously, such as candidates A and B. In a variation on the above implementations, as shown in FIG. 3B, candidate information 304 may be paired with voting information 302 indicating a percentage of the total votes cast by all players which were cast for each candidate. The percentage may be calculated based on the total number of voting points applied to all candidates or based on the total number of voting points which have been associated with players and which are have been, or could be, applied to candidates in the poll. In yet another implementation, such as that shown in FIG. 3C, voting information 302 may include the number of voting points applied by a particular player to a particular candidate, which is identified by candidate information 304. In such an implementation, player information 310 of the player applying the votes may also be shown, such as the name of the player, a user name of the player, a picture of the player, or an icon or avatar of the player. Other types of player information may include statistical data regarding the player, such as the player's past performance in polls. For example, in FIG. 3C, player Mr. Fox is indicated as having applied 250 voting points to candidate A, and voting leaderboard 334 additionally indicates that 45% of the 14,400 voting points previously cast by Mr. Fox have been for winning candidates.

In some implementations, the data displayed by leaderboard 334 may be updated in near-real-time. In other implementations, the data throughput to leaderboard 334 may be managed to avoid situations which generate little excitement among players. For example, if a poll is scheduled to last 3 days, and by the first day, candidate A has received 10,000 votes and candidates B and C have each only received 1000 votes apiece, players may choose not to participate in the polling system because they feel their votes will not contribute meaningfully to the outcome of the poll. To avoid this scenario, the voting server may be configured to sequester applied voting points until much later in the poll. The voting server may, for example, instruct leaderboard 334 to display only a portion of the 10,000 voting points applied to candidate A as of the first day. The voting server may instruct leaderboard 334 to add the remaining voting points to the leaderboard 334 over the span of days 2 and 3. If, for example, a 2000 voting point portion of the 10,000 applied voting points is on display on leaderboard 334 at the end of the first day, players will see a 2000-1000-1000 distribution at the end of the first day, which may not be as daunting a margin. Players may thus be more likely to participate in the poll because they may feel that their votes may make a difference in the outcome.

In some implementations, the entire voting point totals for some or all candidates may actually not be shown at all during the poll. For example, some polls may occur on a repeating basis, such as once per week, and use the same candidates each time, e.g., major political candidates over the course of a months-long election campaign. To maintain long-term interest in such a series of polls, the amounts displayed on leaderboard 334 may be adjusted such that the rankings of the candidates in the poll reflect the actual outcome of the poll but the amounts shown are not indicative of the total number of voting points applied to each candidate during the poll. For example, FIG. 4 depicts a table of three candidates: Alice, Bob, and Charlie. In terms of total voting points applied to each candidate Alice is the clear winner with 10,000 voting points. Bob and Charlie have 2000 and 1000 voting points, respectively. Leaderboard 334 may be instructed to display Alice as the winner, followed by Bob, and then Charlie, which mirrors the outcome according to the voting points applied to each candidate. Leaderboard 334 may, however, depict a much closer voting point spread than is actually reflected in the applied voting points, e.g., showing Alice with 1400 voting points, Bob with 1200 voting points, and Charlie with 1000 voting points. This makes it appear that the contest was a much more closely-fought contest than it actually was, which is more likely to draw repeat interest from players.

In some implementations, there is no limit to the number of voting points which may be in circulation at any given time. In other implementations, voting system 200 may be configured to operate with a finite number of voting points in circulation. For example, voting system 200 may be configured to only provide a total of 1000 voting points to players for a given poll. Voting system 200 may, optionally, also provide a maximum of only one voting point to any one player.

In the example finite-number voting point polling system, after the $1000^{th}$ voting point has been associated with a player, there will be no more unassociated voting points available to associate with additional players who trigger the award of a voting point. Some implementations of voting system 200 may simply cease awarding voting points when this milestone is reached. In other implementations, voting system 200 may identify a player associated with a voting point and disassociate the player with the voting point. By disassociating the player with the voting point, the disassociated voting point is made available for association with a new player.

Disassociation, in the context of voting points, means that the player associated with the voting point before disassociation loses the right to apply the disassociated voting point to a candidate after the disassociation. Disassociation may involve, for example, deletion of a record which links the voting point to the associated player. Other methods of disassociating voting points from players may also be used. For example, a record linking a player to a voting point may remain, but may be marked as disassociated from the player. Another possible method of disassociating a voting point from a player may involve deactivating the voting point completely and adding a replacement voting point into the voting point pool. A player may regain the right to apply a previously-disassociated voting point to a candidate if the disassociated voting point is later re-associated with the player.

Determining from which player to disassociate a voting point may be done using any of several methods. In some implementations, a player may be selected at random for disassociation. In some other implementations, a metric of player performance may be used; players whose metrics fall below a certain level, or which are the least desirable, may be selected for disassociation. For example, a player with the lowest score or lowest number of won polls may be selected for disassociation. In some other implementations, the player who has been associated with a voting point the longest in a group of players may be selected for disassociation. In yet other implementations, a player who loses a direct contest against the player to be awarded the voting point may be selected for disassociation. For example, if the trigger for awarding a voting point is for a player to successfully bluff another player in a poker game, the bluffer's voting point may be obtained by disassociating the bluffee's voting point.

In some implementations featuring finite-number voting point polling systems, some players may obtain immunity from being selected for voting point disassociation for a period of time. Such immunity may be granted to a player in response to a condition being met. For example, immunity from voting point disassociation may be granted to a player in response to a condition similar to a voting point retention condition, discussed in detail later in this paper, being met. In some implementations, the disassociation immunity condition may be based on a player's past applications of voting points or a player's game play.

FIG. 5-A depicts a table showing one particular fixed voting point pool. There are 10 voting points, indicated by the letters A-J, available for association with the 1-12 players of FIG. 2 in FIG. 5-A. In FIG. 5-A, all 10 voting points have been assigned to players 1-10, respectively. There are three candidates shown in FIG. 5-A: Alice, Bob, and Charlie. Alice and Charlie have each had 4 voting points applied to them, whereas Bob has had only one voting points applied to him. In FIG. 5-B, player 6 has had voting point F disassociated in order to allow that voting point to be associated with player 11. Player 6 was selected for disassociation because player 6's score was lower than the other players associated with voting points A-E and G-J. The disassociation of voting point F from player 6 does not result in any change to the total voting points applied to the candidates because player 6 had not previously applied the disassociated voting point to any particular candidate.

After voting point F is associated with player 11, player 11 elects to apply voting point F to Charlie, thereby giving Charlie the lead with 5 voting points, as shown in FIG. 5-C. Player 12 then triggers a voting point award, and player 7 is selected for disassociation from player 7's voting point because player 7's score is the lowest remaining score among the players associated with voting points. Because of the change in player association, the application of player 7's voting point to Charlie is reversed in FIG. 5-D, allowing player 11 to choose to apply voting point G to a candidate of player 11's choice. Player 11, in FIG. 5-E, chooses to vote for Alice, resulting in Alice receiving the highest number of votes: 5.

As mentioned, a player may be associated with more than one voting point. In some implementations, a player may also choose to distribute associated voting points to two or more candidates in a poll. In some implementations, players are not required to have identical numbers of voting points.

Voting points, as discussed above, may be associated with a player as a reward for triggering a particular condition. Such triggers may include one or more of: starting play of a particular game, maintaining a given rate of coin-in over a predetermined period of time, achieving an in-game outcome, achieving a bonus during wagering game play, playing a particular game more than a predetermined period of time, and applying voting points to a candidate in a previous poll which ended up winning. Triggers used to award voting points may, for example, include triggers such as those used to trigger state-based power-ups as discussed in U.S. patent application Ser. No. 13/250,775, by Nicely, entitled "STATE-BASED POWER-UPS," filed concurrently herewith, the entirety of which is incorporated herein by reference for all purposes.

In some implementations, information based on the voting points applied by a player may be communicated to a third party. For example, if the candidates in a poll are contestants in a television show where viewers may vote on which contestant should win, such as American Idol, voting points applied to one of the candidates may be used to provide data to the television show voting system. In some implementations, each voting point applied to a candidate in a poll may also result in a vote being registered towards the corresponding contestant in the television show. In other implementations, a conversion rate may be applied to the voting points applied to a candidate to arrive at data which is transmitted to the television show voting system. For example, 10 voting points may result in a single vote in the television show voting system.

In some implementations, players may be rewarded for applying votes to a candidate which receives the highest (or is among a plurality of candidates receiving the highest) number of voting points. Such rewards may include, for example, maintaining the association of some, or all, of the player's voting points with the player for use in future polls, free credits for use in a gaming machine, complimentary food or beverage, additional voting points for use in future polls, and congratulatory messages. For example, in some implementations, players who apply votes to the candidate in a poll with the highest ranking at the close of the poll may be allowed to maintain their association with the applied voting points for use in future polls.

In other implementations, players may be rewarded for applying voting points to a candidate who wins an outside contest which is resolved after the close of the poll. For example, a poll may ask which baseball team, the Brewers or the Phillies, will win an upcoming, post-poll baseball game between the two teams. In this example, assume that the Brewers end up winning the post-poll baseball game. Players who, prior to knowing the outcome of the baseball game, applied voting points to the Brewers would be rewarded for correctly predicting the winner of the baseball game, i.e., outside contest. In such scenarios, the players may apply voting points to a candidate which loses the poll but which wins the outside contest; such players may also be rewarded.

Players who apply votes to losing candidates may have all, or some, of their associated voting points disassociated. In some implementations, players may be offered the chance to pay a fee to avoid disassociation of their voting points. This may be particularly attractive to players who have accrued a large number of voting points over time.

In some implementations, players may retain voting points applied to a candidate in a poll for application to candidates in future polls if a voting point retention condition is met with respect to the poll. The voting point retention condition may be the same for every poll, or may be changed between some polls. One example of a voting point retention condition includes the player applying more voting points to a highest-ranked candidate of a poll than to any other candidate in the poll. Some voting point retention conditions may include multiple subconditions. For example, a voting point retention condition may include a first subcondition, which is that the player apply more voting points to a highest-ranked candidate of a poll than to any other candidate in the poll, and a second subcondition, which is that the player meet the first subcondition for at least some number N of M successive, preceding polls, where M is a number greater than or equal to N. A further variant of such a multi-subcondition voting point retention condition may include a third subcondition in which the player must maintain a ranking of R or higher among a group of players according to the number of polls in the M successive, preceding polls in which the player meets the second subcondition. For example, in FIG. 6, players A-H may each be playing wagering games in a bank of eight gaming machines, thus forming a group of players. Other methods of establishing a group of players may be used as well, such as using a group defined by a common demographic or outside group identifier, such as a self-designated tour group. In FIG. 6, assuming that M is 10 polls, players H, A, and B would rank first, second, and third, respectively in terms of the number of times out of the M polls in which each player applied voting points to the winning candidate. If the voting point retention condition is that a player must maintain a ranking of second place or higher, only players H and A would be allowed to retain their voting points within the group.

Another example of a voting point retention condition is where the player is allowed to retain their voting points after applying their voting points to a candidate which wins an outside contest, as discussed above. Yet another example of a voting point retention condition is that the player maintains a predetermined rate of coin-in for a wagering game.

A player may keep all of their applied voting points for a given poll when the voting point condition is met regardless of to which candidate they were applied, or only the voting points which are applied in a manner which helped satisfy the voting point retention condition. For example, if a player applied 100 voting points to candidate A, which ended up winning the poll, and 50 voting points to candidate B, and the voting point condition was that the player apply more voting points to the highest-ranking candidate in the poll, the player may have met the voting point retention condition but only be allowed to retain the 100 voting points applied to candidate A; the 50 voting points applied to candidate B would be lost.

All of the following methods and processes, along with other methods and processes of the present invention, may be implemented by software, firmware and/or hardware. For example, the methods of the present invention may be implemented by computer programs embodied in machine-readable media. The machine-readable media may be transitory, such as a carrier wave, or non-transitory, such as volatile or non-volatile memory. The invention may be implemented by networked gaming machines, game servers and/or other such devices. Those of skill in the art will appreciate that the steps of the methods described herein are not necessarily performed (and in some implementations are not performed) in the order shown. Moreover, some implementations of the methods described herein may include more or fewer steps than those shown and/or described.

Figure 7:
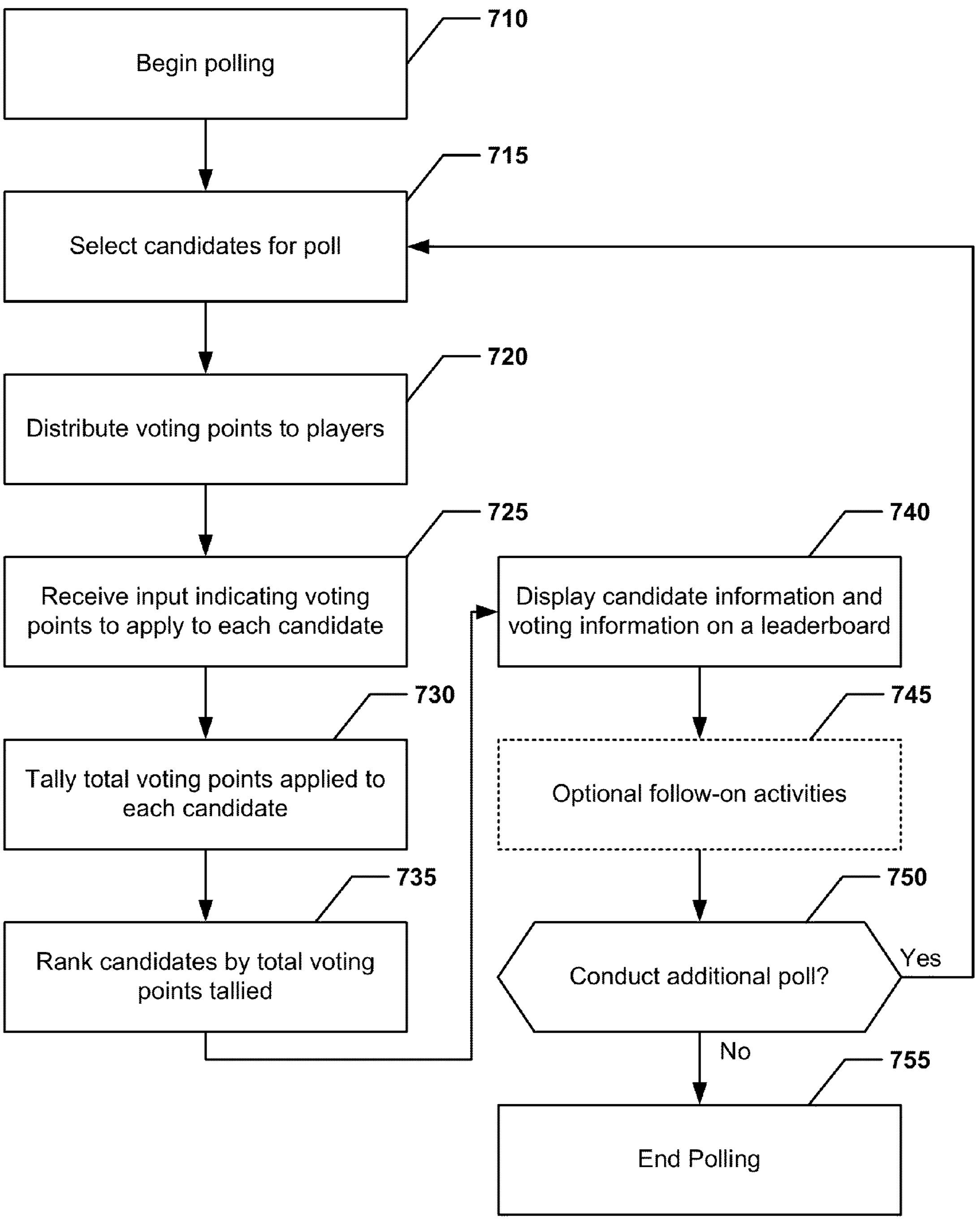
FIG. 7 depicts a high-level diagram of a technique for conducting a poll.

In one implementation, as shown at a high level in FIG. 7, polling using a voting point polling system may begin (710). Candidates may be selected for inclusion in the poll (715). Such selection may be the result of manual input, e.g., personnel who enter or select the candidates for inclusion, or the result of an automated process, e.g., retrieving sports teams or race horses from a sports information server which may be competing against each other in upcoming events. Voting points may be distributed to players (720) as discussed above. Such distribution may occur while the poll is being conducted, or may have occurred entirely or in part before the poll is initiated. Input may be received indicated from players indicating quantities of voting points to apply to candidates in the poll (725). The voting points applied to each candidate in the poll may be tallied (730), and each candidate may be ranked according to the total voting points tallied (735). Candidate information and voting point information, as discussed above, may be displayed on a voting leaderboard (740). Follow-on activities may be conducted (745), as described further in FIGS. 8-10. Additional polls may be conducted (750), or the polling may end (755).

Figure 8:
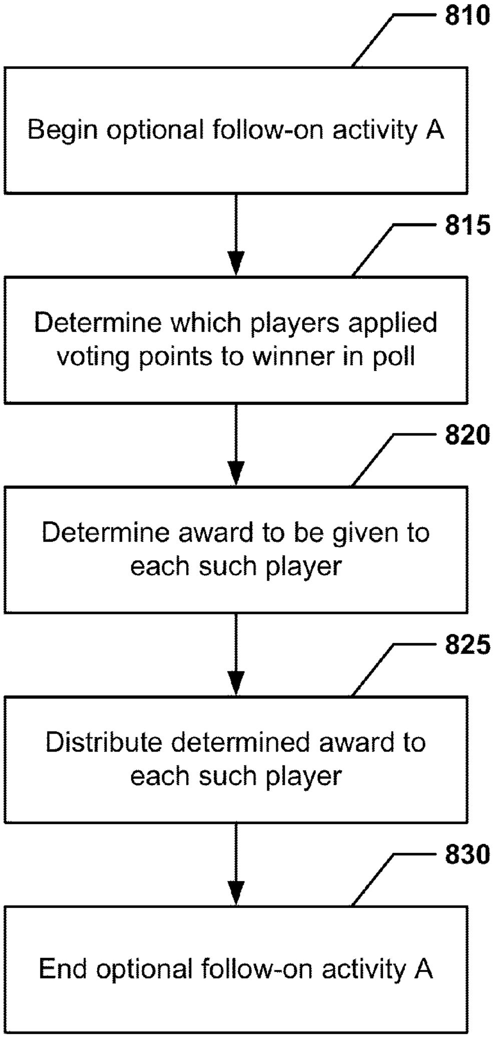
FIGS. 8-10 depict high-level diagrams of various follow-on activities which may be performed as part of implementing the technique depicted in FIG. 7.
Figure 9:
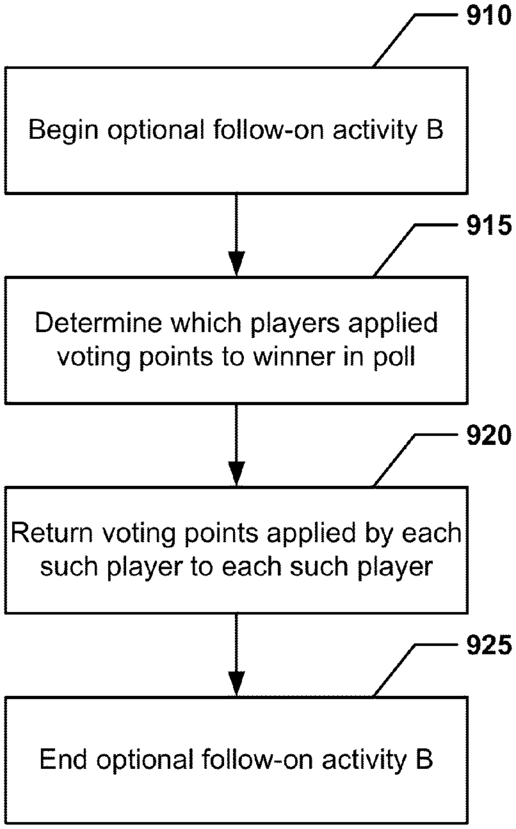

In one follow-on activity, shown at a high-level in FIG. 8, the follow-on activity may begin (810) and it may be determined which players applied voting points to a winning candidate of the poll. An award to be given to each such player, e.g., a congratulatory message, power-up, free credits, or voucher for free food or drink, may then be determined (820) and distributed to each such player (825). The follow-on activity may then end (830). FIG. 9 shows a similar follow-on activity in which steps 910 and 915 are similar to steps 810 and 815, but where the voting points applied by each player to the winning candidate are returned to the player (920) after the poll. The follow-on activity may then end (925).

Figure 10:
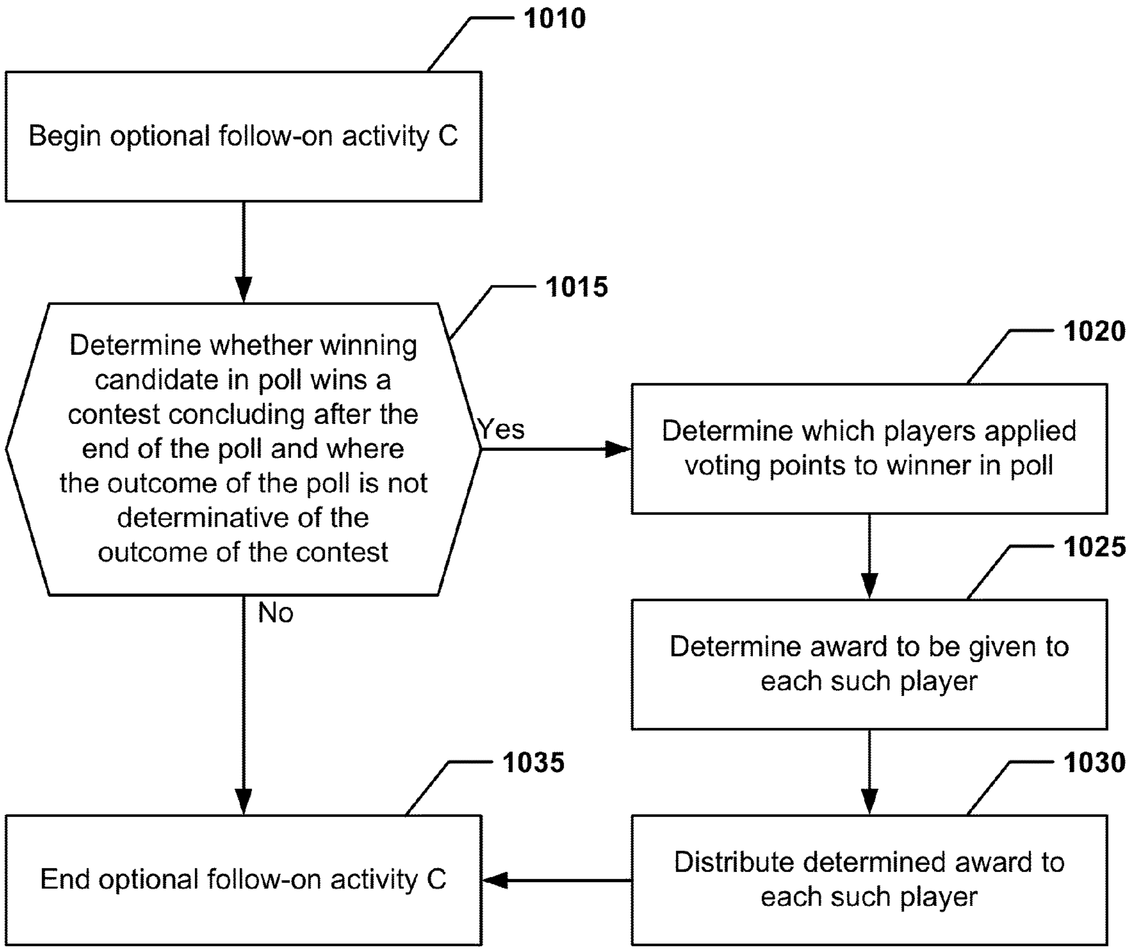

In another implementation, shown in FIG. 10, a follow-on activity begins (1010). It is then determined if a winning candidate in the poll wins an outside contest concluding after the end of the poll and where the outcome of the poll is not determinative of the outcome of the contest (1015), e.g., candidate A wins the poll and is also the contestant in American Idol who wins the next American Idol contest. If the winning candidate in the poll did not also win the outside contest, the follow-on activity ends (1035). If the winning candidate in the poll also won the outside contest, it may be determined which players applied voting points to the winning candidate (1020). An award to be given to each such player may be determined (1025) and distributed to each such player (1030). The follow-on activity may then end (1035).

Figure 11:
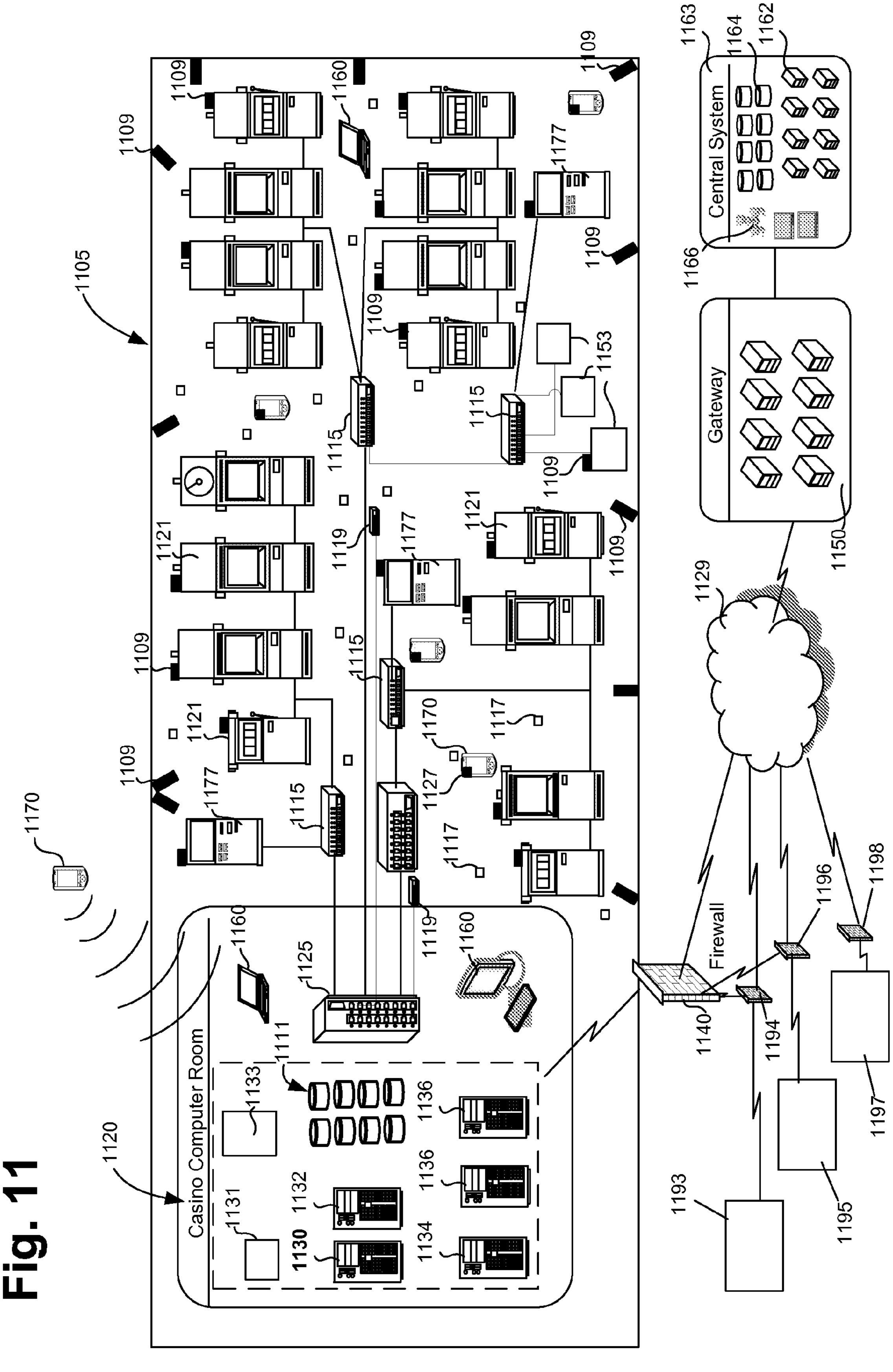
FIG. 11 depicts a high-level conceptual schematic of a wager gaming system which may be used to implement the techniques described herein.

FIG. 11 shows a server-based (Sb™) gaming network which may be used to implement some implementations described above. Those of skill in the art will realize that this architecture and the related functionality are merely examples and that the present disclosure encompasses many other such implementations and methods.

Here, casino computer room 1120 and networked devices of a gaming establishment 1105 are illustrated. Gaming establishment 1105 is configured for communication with central system 1163 via gateway 1150. Gaming establishments 1193 and 1195 are also configured for communication with central system 1163.

In some implementations, gaming establishments may be configured for communication with one another. In this example, gaming establishments 1193 and 1195 are configured for communication with casino computer room 1120. Such a configuration may allow devices and/or operators in casino 1105 to communicate with and/or control devices in other casinos. In some such implementations, a server in computer room 1120 may control devices in casino 1105 and devices in other gaming establishments. Conversely, devices and/or operators in another gaming establishment may communicate with and/or control devices in casino 1105.

Here, gaming establishment 1197 is configured for communication with central system 1163, but is not configured for communication with other gaming establishments. Some gaming establishments (not shown) may not be in communication with other gaming establishments or with a central system. Gaming establishment 1105 includes multiple gaming machines 1121, each of which is part of a bank 1110 of gaming machines 1121. In this example, gaming establishment 1105 also includes a bank of networked gaming tables 1153. However, the present disclosure may be implemented in gaming establishments having any number of gaming machines, gaming tables, etc. It will be appreciated that many gaming establishments include hundreds or even thousands of gaming machines 1121 and/or gaming tables 1153, not all of which are necessarily included in a bank and some of which may not be connected to a network. At least some of gaming machines 1121 and/or mobile devices 1170 may be "thin clients" that are configured to perform client-side methods as described elsewhere herein. Gaming machines 1121, gaming tables 1153, and/or mobile devices 1170 may be used to receive voting point input from players.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 1153 may be configured for communication with individual player terminals (not shown), which may be configured to accept bets, present an electronic representation of a dealer, indicate game outcomes, etc.

Gaming establishment 1105 also includes networked kiosks 1177. Depending on the implementation, kiosks 1177 may be used for various purposes, including but not limited to cashing out, prize redemption, redeeming points from a player loyalty program, redeeming "cashless" indicia such as bonus tickets, smart cards, etc. In some implementations, kiosks 1177 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, kiosks 1177 may be configured to receive information from a patron, e.g., by presenting graphical user interfaces, which allows the patron to apply voting points to a candidate in a poll.

In this example, each bank 1110 has a corresponding switch 1115, which may be a conventional bank switch in some implementations. Each switch 1115 is configured for communication with one or more devices in computer room 1120 via main network device 1125, which combines switching and routing functionality in this example. Players playing on a common bank may be grouped together for voting point retention conditions, as described previously. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various implementations of the disclosure. IGT has also developed a gaming-industry-specific transport layer called CASH that rides on top of TCP/IP and offers additional functionality and security.

Here, gaming establishment 1105 also includes an RFID network, implemented in part by RFID switches 1119 and multiple RFID readers 1117. An RFID network may be used, for example, to track objects (such as mobile gaming devices 1170, which include RFID tags 1127 in this example), patrons, etc., in the vicinity of gaming establishment 1105.

As noted elsewhere herein, some implementations of the disclosure may involve "smart" player loyalty instruments, such as player tracking cards, which include an RFID tag. Accordingly, the location of such RFID-enabled player loyalty instruments may be tracked via the RFID network. In this example, at least some of mobile devices 1170 may include an RFID tag 1127, which includes encoded identification information for the mobile device 1170. Accordingly, the locations of such tagged mobile devices 1170 may be tracked via the RFID network in gaming establishment 1105. Other location-detection devices and systems, such as the global positioning system ("GPS"), may be used to monitor the location of people and/or devices in the vicinity of gaming establishment 1105 or elsewhere.

Various alternative network topologies can be used to implement different implementations of the disclosure and/or to accommodate varying numbers of networked devices. For example, gaming establishments with large numbers of gaming machines 1121 may require multiple instances of some network devices (e.g., of main network device 1125, which combines switching and routing functionality in this example) and/or the inclusion of other network devices not shown in FIG. 11. Some implementations of the disclosure may include one or more middleware servers disposed between kiosks 1177, RFID switches 1119 and/or bank switches 1115 and one or more devices in computer room 1120 (e.g., a corresponding server). Such middleware servers can provide various useful functions, including but not limited to the filtering and/or aggregation of data received from switches, from individual gaming machines and from other devices. Some implementations of the disclosure include load-balancing methods and devices for managing network traffic.

Storage devices 1111, Sb™ server 1130, License Manager 1131, Arbiter 1133, servers 1132, 1134, 1136 and 1138, host device(s) 1160 and main network device 1125 are disposed within computer room 1120 of gaming establishment 1105. In practice, more or fewer devices may be used. Depending on the implementation, some such devices may reside in gaming establishment 1105 or elsewhere.

One or more devices in central system 1163 may also be configured to perform, at least in part, tasks specific to the present disclosure. For example, one or more servers 1162, arbiter 1133, storage devices 1164 and/or host devices 1160 of central system 1163 may be configured to implement the functions described in detail elsewhere herein. These functions may include, but are not limited to, providing functionality for devices such as wager gaming machines 1121, mobile devices 1170, etc.

One or more of the servers of computer room 1120 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 1109, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of computer room 1120 to mobile devices 1170. Some implementations of the present disclosure include a plurality of networked cameras 1109, which may be video cameras, smart cameras, digital still cameras, etc. In some such implementations, such cameras may provide, at least in part, real-time navigation.

Other devices that may be deployed in network 1105 do not appear in FIG. 11. For example, some gaming networks may include not only various radio frequency identification ("RFID") readers 1117, but also RFID switches, middleware servers, etc., some of which are not depicted in FIG. 11. These features may provide various functions. For example, a server (or another device) may determine a location of a mobile device 1170 according to the location of an RFID reader that reads an RFID tag 1127.

The servers and other devices indicated in FIG. 11 may be configured for communication with other devices in or outside of gaming establishment 1105, such as host devices 1160, kiosks 1177 and/or mobile devices 1170, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, poll management and voting point tracking and allocation, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some implementations of Sb™ server 1130 and the other servers shown in FIG. 11 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the disclosure, many of these devices (including but not limited to License Manager 1131, servers 1132, 1134, 1136, and 1138, and main network device 1125) are mounted in a single rack with Sb™ server 1130. Accordingly, many or all such devices will sometimes be referenced in the aggregate as an "Sb™ server." However, in alternative implementations, one or more of these devices is in communication with Sb™ server 1130 and/or other devices of the network but located elsewhere. For example, some of the devices could be mounted in separate racks within computer room 1120 or located elsewhere on the network. Moreover, it can be advantageous to store large volumes of data elsewhere via a storage area network ("SAN").

Computer room 1120 may include one or more operator consoles or other host devices that are configured for communication with other devices within and outside of computer room 1120. Such host devices may be provided with software, hardware and/or firmware for implementing various implementations of the disclosure. However, such host devices need not be located within computer room 1120. Wired host devices 1160 (which are desktop and laptop computers in this example) and wireless devices 1170 (which are PDAs in this example) may be located elsewhere in gaming establishment 1105 or at a remote location.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

It will be understood that unless features in any of the above-described implementations are expressly identified as incompatible with one another or the surrounding context implies that they are mutually exclusive and not readily combinable in a complementary and/or supportive sense, the totality of this disclosure contemplates and envisions that specific features of those implementations can be selectively combined to provide one or more comprehensive, but slightly different, technical solutions. It will therefore be further appreciated that the above description has been given by way of example only and that modifications in detail may be made within the scope of the invention.

What is claimed is:

1. A wager gaming player polling server comprising:

a communications interface;

a memory; and a logic device, the logic device, the memory, and the communications interface operably connected and configured to:

determine a first plurality of candidates for inclusion in a first poll, the first plurality of candidates including a first candidate, receive input, via the communications interface, indicating a first quantity of voting points associated with a first player to apply towards the first candidate in the first poll, determine, based on a total number voting points applied to each candidate in the first plurality of candidates by players in a plurality of players, the first player included in the plurality of players, a ranking for each candidate in the first poll;

determine that a voting point retention condition has been met with respect to the first poll; and maintain the association of the first quantity of voting points with the first player at least until a second poll is conducted.

2. The wager gaming player polling server of claim 1, wherein the logic device, the memory, and the communications interface are further configured to:

determine a second plurality of candidates for inclusion in a second poll, the second plurality of candidates including a second candidate;

receive input, via the communications interface, indicating a second quantity of voting points associated with the first player to apply towards the second candidate in the second poll, and determine, based on a total number voting points applied to each candidate in the second plurality of candidates by the players in the plurality of players, a ranking for each candidate in the second poll;

determine that the voting point retention condition has not been met with respect to the second poll; and disassociate at least the second quantity of voting points from the first player after determining that the voting point retention condition has not been met.

3. The wager gaming player polling server of claim 2, wherein the logic device, the memory, and the communications interface are further configured, for each intermediate poll in one or more intermediate polls in between the first poll and the second poll, to:

determine a plurality of candidates for inclusion in the intermediate poll;

receive input, via the communications interface, indicating a quantity of voting points associated with the first player to apply towards a candidate in the intermediate poll, and determine, based on a total number voting points applied to each candidate in the plurality of candidates by the players in the plurality of players, a ranking for each candidate in the intermediate poll; and determine, for each intermediate poll, that the voting point retention condition has been met with respect to the intermediate poll.

4. The wager gaming player polling server of claim 1, wherein the voting point retention condition, with respect to any particular poll of the first poll, the second poll, and the one or more intermediate polls, is that the first player apply more voting points to a highest-ranked candidate of the particular poll than to any other candidate in the particular poll.

5. The wager gaming player polling server of claim 3, wherein the voting point retention condition comprises a first subcondition and a second subcondition, wherein the first subcondition, with respect to any particular poll of the first poll, the second poll, and the one or more intermediate polls, is that the first player apply more voting points to a highest-ranked candidate of the particular poll than to any other candidate in the particular poll, and wherein the second subcondition is that the first subcondition be met for at least N of M successive polls.

6. The wager gaming player polling server of claim 1, wherein the voting point retention condition, with respect to any particular poll of the first poll, the second poll, and the one or more intermediate polls, is that:

the first player apply more voting points to a highest-ranked candidate of the particular poll than to any other candidate in the particular poll, and the highest-ranked candidate in the particular poll win a contest which concludes after the end of the particular poll.

7. The wager gaming player polling server of claim 5, wherein the voting point retention condition further comprises a third subcondition, wherein the third subcondition is that the first player maintain a minimum ranking R or higher among a group of players including the first player, wherein each particular player in the group of players is ranked according to the number of polls in the M successive polls in which the particular player met the second subcondition.

8. The wager gaming player polling server of claim 1, wherein the voting point retention condition comprises the first player maintaining a predetermined coin-in rate.

9. Computer software embodied in a machine-readable medium, the computer software including instructions for controlling devices in a gaming network, the gaming network including a server, a storage device communicatively connected to the server, and a plurality of input stations, to:

determine, by the server, a first plurality of candidates for inclusion in a first poll, the first plurality of candidates including a first candidate, receive, via a player input station in the plurality of player input stations, input indicating a first quantity of voting points associated with a first player in a plurality of players to apply towards the first candidate in the first poll, determine, by the server and based on a total number voting points applied to each candidate in the first plurality of candidates by the players in the plurality of players, a ranking for each candidate in the first poll, determine, by the server, that a voting point retention condition has been met with respect to the first poll, and maintain, by the server, the association of the first quantity of voting points with the first player at least until a second poll is conducted.

10. The machine-readable medium of claim 9, wherein the computer software further includes instructions for controlling the devices in the gaming network to:

determine a second plurality of candidates for inclusion in a second poll, the second plurality of candidates including a second candidate and the second poll after the first poll, receive, from the first player, input indicating a second quantity of voting points associated with the first player to apply towards the second candidate in the second poll, determine, based on a total number voting points applied to each candidate in the second plurality of candidates by the players in the plurality of players, a ranking for each candidate in the second poll, determine that the voting point retention condition has not been met with respect to the second poll, and disassociate at least the second quantity of voting points from the first player after determining that the voting point retention condition has not been met.

11. The machine-readable medium of claim 10, wherein the computer software further includes instructions for controlling the devices in the gaming network to, for each intermediate poll in one or more intermediate polls in between the first poll and the second poll, to:

determine a plurality of candidates for inclusion in the intermediate poll, receive, from the first player, input indicating a quantity of voting points associated with the first player to apply towards a candidate in the intermediate poll, determine, based on a total number voting points applied to each candidate in the plurality of candidates by the players in the plurality of players, a ranking for each candidate in the intermediate poll, and determine that the voting point retention condition has been met with respect to the intermediate poll.

12. The machine-readable medium of claim 9, wherein the voting point retention condition, with respect to any particular poll of the first poll, the second poll, and the one or more intermediate polls, is that the first player apply more voting points to a highest-ranked candidate of the particular poll than to any other candidate in the particular poll.

13. The machine-readable medium of claim 11, wherein the voting point retention condition comprises a first subcondition and a second subcondition, wherein the first subcondition, with respect to any particular poll of the first poll, the second poll, and the one or more intermediate polls, is that the first player apply more voting points to a highest-ranked candidate of the particular poll than to any other candidate in the particular poll, and wherein the second subcondition is that the first subcondition be met for at least N of M successive polls.

14. The machine-readable medium of claim 9, wherein the voting point retention condition, with respect to any particular poll of the first poll, the second poll, and the one or more intermediate polls, is that:

the first player apply more voting points to a highest-ranked candidate of the particular poll than to any other candidate in the particular poll, and the highest-ranked candidate in the particular poll win a contest which concludes after the end of the particular poll.

15. The machine-readable medium of claim 13, wherein the voting point retention condition further comprises a third subcondition, wherein the third subcondition is that the first player maintain a minimum ranking R or higher among a group of players including the first player, wherein each particular player in the group of players is ranked according to the number of polls in the M successive polls in which the particular player met the second subcondition.

16. The machine-readable medium of claim 9, wherein the voting point retention condition comprises the first player maintaining a predetermined coin-in rate.

* * * * *